US011496626B2

(12) United States Patent
Bergher et al.

(10) Patent No.: US 11,496,626 B2
(45) Date of Patent: *Nov. 8, 2022

(54) SYSTEMS AND METHODS FOR FLEXIBLE AND EXTENSIBLE CONTACT CENTER ROUTING

(71) Applicant: GLADLY SOFTWARE, INC., San Francisco, CA (US)

(72) Inventors: Bruno Bergher, San Francisco, CA (US); Michael Hicks, Oakland, CA (US); Ramon Novales, Walnut, CA (US); So Eun Park, San Francisco, CA (US); Aleksey Tsibulya, San Rafael, CA (US); Kuan Jen Wang, San Francisco, CA (US); Jeffrey Zych, San Francisco, CA (US)

(73) Assignee: GLADLY SOFTWARE, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/588,027

(22) Filed: Jan. 28, 2022

(65) Prior Publication Data

US 2022/0150357 A1 May 12, 2022

Related U.S. Application Data

(63) Continuation of application No. 17/489,387, filed on Sep. 29, 2021, which is a continuation of application No. 16/595,234, filed on Oct. 7, 2019, now Pat. No. 11,153,440.

(51) Int. Cl.
*H04M 3/00* (2006.01)
*H04M 3/523* (2006.01)
*H04M 3/51* (2006.01)

(52) U.S. Cl.
CPC ....... *H04M 3/5232* (2013.01); *H04M 3/5183* (2013.01)

(58) Field of Classification Search
CPC ............. H04M 3/5175; H04M 3/523; H04M 3/42221; H04M 3/5232; H04M 3/5238; H04M 3/5158
See application file for complete search history.

(56) References Cited

PUBLICATIONS

International Preliminary Report and Written Opinion on the Patentability of Application No. PCT/US2020/054642 dated Apr. 21, 2022, 6 pages.

*Primary Examiner* — Rasha S Al Aubaidi
(74) *Attorney, Agent, or Firm* — Womble Bond Dickinson (US) LLP

(57) ABSTRACT

Systems and methods for flexible and extensible contact center routing are disclosed. Incoming communications are received at a contact center from one or more customers. A pairing score is determined for each agent capable of servicing the incoming communications for each of the one or more customers based on customer attributes and/or agent attributes that are adjustable and extensible. An incoming communication is routed from a customer to an agent having a highest pairing score with the customer. The incoming communication can be routed on a first communication channel and then switched over to a second communication channel. The first communication channel and second communication channel can be different types of communication channels.

18 Claims, 19 Drawing Sheets

| Agents 201 | Customer 202 | Scoring Pair 203 | 200 |
|---|---|---|---|
| 1 | 3 | 14 | |
| 2 | 3 | 14 | |
| 3 | 3 | 12 | |
| 4 | 3 | 16 ← Highest Scoring Pair | |
| 5 | 3 | 14 | |

FIG. 2A

| Agents 206 | Previously Contacted Customer 207 | Language(s) 208 | Expertise 209 |
|---|---|---|---|
| 1 Salvatore | None | Spanish | Products |
| 2 Gina | 3 | English, Spanish | Billing |
| 3 Terry | None | English | Billing |
| 4 Jean-Michel | 3, 5 | English | Products |
| 5 Ling | None | English | Products |

FIG. 2B

| Customers | Name | Channel | Minutes Waiting | Status | Language(s) | Snowstorm | Issue area |
|---|---|---|---|---|---|---|---|
| 1 | Ingrid | Text | 0.5 | Premium | English | No | Billing |
| 2 | Maria | SMS | 7 | None | Spanish | No | Billing |
| 3 | Jose | Email | 10 | None | English, Spanish | Yes | Products |
| 4 | Jeannette | Phone | 15 | Basic | Spanish | No | Billing |
| 5 | Antoine | Phone | 4 | None | English | No | Unknown |

FIG. 2C

Attributes Selected Agent:

| | |
|---|---|
| Agent Name | Salvatore |
| Agent ID | 1 |
| Previously contacted customer ID(s) | None |
| Language(s) | Spanish |
| Expertise | Products |

Attributes Matched Customer:

| | |
|---|---|
| Customer Name | Jose |
| Customer ID | 3 |
| Channel | Email |
| Minutes waiting | 10 |
| Status | None |
| Language(s) | English, Spanish |
| Snowstorm Impact | Yes, Extreme |
| Issue area | Products |

Scoring Pair For All Customers:

| | |
|---|---|
| Ingrid | 2 |
| Maria | 3 |
| Jose | 14 |
| Jeannette | 7 |
| Antoine | 1 |

Highest Scoring Pair Calculation: 14

| *Matched Attributes:* | *Matched Attribute Subscores:* |
|---|---|
| Snowstorm Impact | 10 |
| Same Language | 2 |
| Subject Matter Expertise | 2 |

FIG. 2D

| Criteria ID (226) | Name (227) | Boolean (228) | Attribute (229) | Operator (230) | Desired (231) | Importance toRouting (232) |
|---|---|---|---|---|---|---|
| 1 | Previous Contact | | Agent: Previously contacted customer ID(s) | INCLUDES | Customer: ID | Medium |
| 2 | Premium Status | | Customer: Status | = | Premium | Low |
| 3 | Snowstorm Impact | | Customer: Snowstorm impact | = | Yes | Extreme |
| 4 | Some Wait | AND<br>AND | Customer: Time waiting (min)<br>Customer: Time waiting (min) | >=<br>< | 4<br>11 | Low |
| 5 | Long Wait | | Customer: Time waiting (min) | >= | 11 | High |
| 6 | Same Language | AND<br>OR<br>AND | Customer: Language<br>Agent: Language<br>Customer: Language<br>Agent: Language | =<br>=<br>=<br>= | English<br>English<br>Spanish<br>Spanish | Medium |
| 7 | Subject Matter Expertise | AND<br>OR<br>AND<br>OR<br>AND | Customer: Issue area<br>Agent: Expertise<br>Customer: Issue area<br>Agent: Expertise<br>Customer: Issue area<br>Agent: Expertise | =<br>=<br>=<br>=<br>=<br>= | Billing<br>Billing<br>Products<br>Products<br>Tech/Website<br>Tech/Website | Medium |

Pair to evaluate (241)

Agent: 1   Customer: 3

Criteria T/F (243)

| Criterion ID | Criterion Name | T/F | Score |
|---|---|---|---|
| 1 | Previous Contact | FALSE | |
| 2 | Premium Status | FALSE | |
| 3 | Snowstorm Impact | TRUE | 10 |
| 4 | Some Wait | FALSE | |
| 5 | Long Wait | FALSE | |
| 6 | Same Language | TRUE | 2 |
| 7 | Subject Matter Expertise | TRUE | 2 |

Temporary Data Store (242) — 240

| | |
|---|---|
| Agent Name | Salvatore |
| Previously contacted customer ID(s) | None |
| Language(s) | Spanish |
| Expertise | Products |
| Customer Name | Jose |
| Channel | Email |
| Minutes waiting | 10 |
| Status | None |
| Language(s) | English, Spanish |
| Snowstorm Impact? | Yes |
| Issue area | Products |

Total Score for this Pair: 14

FIG. 2F

Channels

Email — 401

| ENTRY POINT | NAME — 402 | INBOX — 403 | SLA IN MINUTES — 404 |
|---|---|---|---|
| example1@anyaddress.com | Enter name | World Reservations | 1440 |
| example2@anyaddress.com | Enter name | reservation.support | 1440 |
| example3@anyaddress.com | Enter name | special.requests | 1440 |
| example4@anyaddress.com | Enter name | Website Inquiry | 1440 |
| example5@anyaddress.com | Enter name | Reservations Orlando | 720 |
| example6@anyaddress.com | Enter name | urgent.orlando | 240 |
| example7@anyaddress.com | Enter name | Reservations Houston | 720 |
| example8@anyaddress.com | Enter name | urgent.houston | 240 |
| example9@anyaddress.com | Enter name | expecttheexperience | 1440 |
| example10@anyaddress.com | Enter name | gift.card | 1440 |
| example11@anyaddress.com | Enter name | Long Conversations Test-old | 1440 |

Add Entry Point

Save

FIG. 4A

< Inboxes

| | | |
|---|---|---|
| help@inbound.com | Enter name | Email - Acceptance Testing > 120 |
| name1@inbound.com | Enter name | thread > 60 |
| name2@inbound.com name3@inbound.com | Enter name | 2018-11-13-Example > 720 |
| name4@inbound.com | Any Support | Urgent-Acceptance Testing > 15 |
| | | example.wholesale > 1440 |

Phone — 406

After Call Work (in sec) — 15

Time to route next call after declining (in sec) — 15

ENTRY POINT — 401    NAME — 402    INBOX — 403    SLA IN MINUTES — 404

| ENTRY POINT | NAME | INBOX | SLA IN MINUTES |
|---|---|---|---|
| +11234567891_si_voice_test | Enter name | si-voice-test automation > | 1440 |
| +11234567892 | Enter name | Phone Testing - Backup > | 1 |
| +11234567893_cust_serv | customer service voice number | Phone - Acceptance Testing > | 1 |
| +11234567894_testGroup2 | test group2 | Scale Test Phone 2 > | 1 |
| +11234567895_voicemail | customer service voicemail | Phone - Acceptance Testing > | 60 |
| +11234567896_testGroup1 | test group1 | Scale Test Phone 2 > | 1 |

Save

410 — Next

FIG. 4B

Rules

WHEN AN Email is received

AND meets all these conditions ⏤ 501

| THE | Email from | contains | johndoe@example.com | ○ Case sensitive |
| THE | Email subject | contains | sam | ○ Case sensitive |

Separate matches with commas
Separate matches with commas

FOR New and ongoing conversations any
any

Add

THEN take these actions ⏤ 502

ADD Topics | Negative ✕ | Choose an answer

SEND Auto-reply | Select...

Add

Save    Cancel

FIG. 5

SYSTEMS AND METHODS FOR FLEXIBLE AND EXTENSIBLE CONTACT CENTER ROUTING

RELATED APPLICATION

The present application is a continuation of and claims the benefit of U.S. patent application Ser. No. 17/489,387, filed on Sep. 29, 2021 which is a continuation of and claims the benefit of U.S. patent application Ser. No. 16/595,234, filed on Oct. 7, 2019 and entitled "SYSTEMS AND METHODS FOR FLEXIBLE AND EXTENSIBLE CONTACT CENTER ROUTING" and which is incorporated by reference in its entirety.

FIELD

Embodiments and examples of the present invention relate to contact centers and data processing and methods for contact center routing. More particularly, embodiments of the present invention relate to systems and methods for flexible and extensible contact center routing.

BACKGROUND

Today, entities or companies provide customer service using a contact center. For instance, a customer can contact in to a contact center that routes the contact to an available agent for servicing the customer. A conventional contact center can use skill-based routing to route contacts from a customer based on the skills of the agent. For example, a customer may indicate a need to cancel a credit card that was stolen, and be placed in a queue serviced by an agent experienced with canceling credit cards. Typically, the agent services the customers in order from the queue. This type of routing is rigid and can be problematic for specific scenarios. For example, a customer having a credit card that was stolen and is currently being used by an unauthorized person. The customer having a stolen credit card should be serviced immediately by an agent in contrast to a customer who may have simply misplaced a credit card and there have not been any unauthorized purchases over a long period of time. In this situation, the contact center should be flexible to route customer contacts having a high priority for service by agents accordingly.

Furthermore, contact centers provide service to customers on multiple communication channels, e.g., telephone contacts, emails, text messages, short message service (SMS) messages, social media etc. Contact centers should also be flexible to adjust the routing of different contacts on multiple communication channels to appropriate agents based on any number of reasons to improve customer service. For example, a customer may have used SMS messaging to start a communication with a contact center, but realizes that sending texts is cumbersome and speaking with an agent directly would be more effective.

Contact centers may also assign work to their agents, which may not be based on inbound communications from a customer. Some of these tasks may be of higher importance than working on inbound communications, and should be routed accordingly. For instance, in the example of the credit card support, an agent may create a task to check one day after the call that a fraudulent charge was removed. A day later an agent would be routed the work to reach out to the customer without an inbound call because this work could be more important or time-sensitive than an inbound message or communication from another customer who misplaced their card. Such routing flexibility is needed to improve customer service over multiple communication channels with agents.

SUMMARY

Systems and methods are disclosed for flexible and extensible contact center routing. The disclosed routing techniques provide built-in flexibility and extensibility to address different situations and scenarios to match customers to the right agent while providing seamless routing over multiple channels in order to improve customer service. For one embodiment, at a contact center, incoming contacts are received from one or more customers. A pairing score is determined for each agent capable of servicing the incoming contacts with each of the one or more customers based on customer attributes and/or agent attributes that are adjustable and extensible. An incoming contact is routed from a customer to an agent based on a highest pairing score for the customer. Determining the pairing score can also be based on more guidelines, criteria, or Boolean representation that are adjustable, flexible and extensible.

For one embodiment, the customer attributes and/or agent attributes, guidelines, criteria, or Boolean representation are adjusted. A new pairing score can be determined for each agent capable of servicing the incoming contacts with each of the one or more customers based on the adjusted customer attributes and/or adjusted, guidelines, criteria, or Boolean representation. For one embodiment, the incoming contacts are routed on one or more communication channels including a short message service (SMS) message channel, text message channel, telephone contact channel, cell phone channel, email channel, social media channel, messenger channel, voicemail channel, phone callback channel, fax channel, or chat channel. For one embodiment, the routed incoming contact can be switched over from a first communication channel to a second communication channel. The second communication channel can be a different type of channel from the first communication channel.

Other methods, systems, and computer readable-mediums are described.

BRIEF DESCRIPTION OF THE DRAWINGS

The appended drawings illustrate examples and embodiments and are, therefore, exemplary and not considered to be limiting in scope.

FIG. 2A illustrates one embodiment of a routing database table matching agents to customers based on a highest scoring pair.

FIG. 2B illustrates one embodiment of a routing database table showing attributes for agents.

FIG. 2C illustrates one embodiment of a routing database table showing attributes for customers.

FIG. 2D illustrates one embodiment of a routing database table showing scoring based on customer and agent attributes of FIG. 2C.

FIG. 2E illustrates one embodiment of a routing database table showing a list of criteria to match agents with customers along with relative importance of those criteria to scoring.

FIG. 2F illustrates one embodiment of a routing database table showing a scenario of evaluating an agent and customer according to the criteria of FIG. 2E.

FIGS. 4A-4B illustrates one embodiment of screen shots of an administration interfaces for setting up communications with customers on multiple communication channels.

FIG. 5 illustrates one embodiment of a screen shot of exemplary rules or criteria for matching customers to agents.

DETAILED DESCRIPTION

Figure 1A:
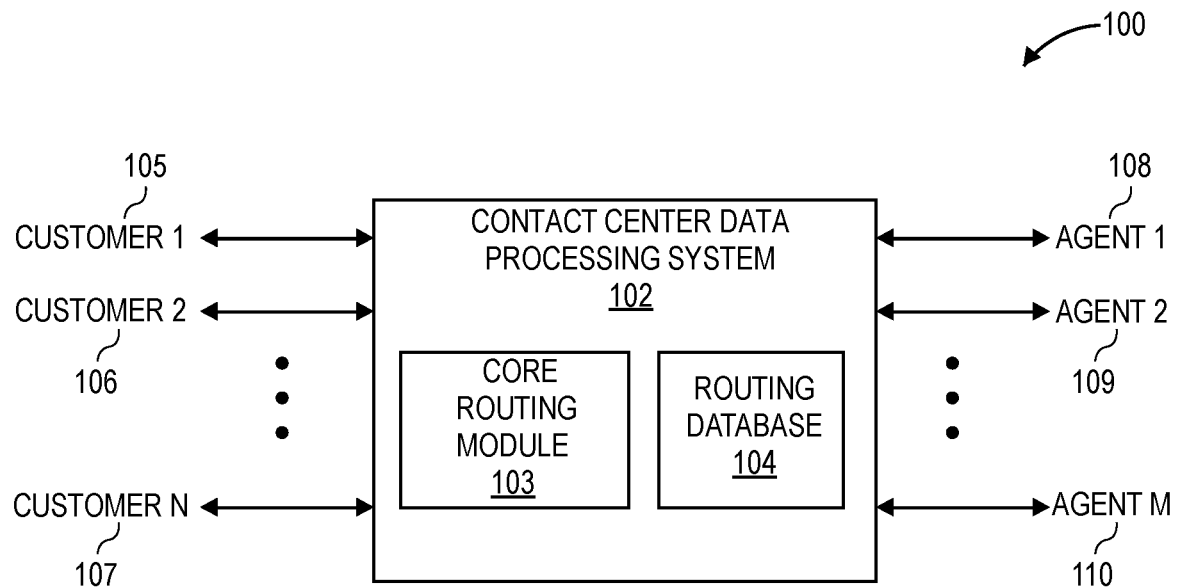
FIG. 1A illustrates one embodiment of a flexible and extensible contact center environment.

Systems and methods are disclosed for flexible and extensible contact center routing. For one embodiment, a contact center uses customer attributes and/or agent attributes that are adjustable and extensible for determining a scoring pair between an agent with each customer. For other embodiments, in addition to customer and agent attributes, one or more guidelines, criteria, or Boolean representation can be used for determining a scoring pair, which are also adjustable and extensible. For example, if customer 1 speaks Spanish and agent 1 speaks Spanish and previously serviced customer 1, then agent 1 would be given a higher pairing score over other agents who may not speak Spanish and may not have helped customer 1 before. The customer and agent attributes, guidelines, criteria or Boolean representation can be adjusted or extended according to the requirements of the contact center (e.g., a contact center may place higher priority for repeat customers over non-repeat customers waiting a longer time to be serviced by an agent). In this way, the scoring pair between agents and customers is simple and can prioritize a situation relative to the requirements on how the contact center is to operate.

For one embodiment, incoming contacts are routed on any number of communication channels between customers and agents. Examples of communication channels include a short message service (SMS) message channel, text message channel, telephone contact channel, cell phone channel, email channel, social media channel, messenger channel, voicemail channel, phone callback channel, fax channel, or chat channel. Routing of contacts on these communications channels can be flexible such that a contact center can switch from one communication channel to a different communication channel. For example, a customer may have started a contact using SMS messaging, but now desires to speak with an agent directly. The techniques disclosed herein allow the contact center to switch over from one communication channel to a different communication channel—e.g., switching between a SMS communication channel to a telephone communication channel. By doing so, the techniques enable a seamless transition of communication for the customer-agent pair when switching communication channels. Accordingly, the disclosed flexible and extensible routing techniques improve on the rigidness of conventional contact centers to meet customer needs which can be continuously changing.

For purposes herein, channels can refer to any means of communication that can be used to provide service and communication between a company and a consumer or customer. Channels can include, but are not limited to, using a kiosk, one or more phone calls, one or more video calls, video conferencing, communication applications that include calling functionality such as, for example, FaceTime, WhatsApp, Skype , communication applications that operate like Google Hangouts, real-time hologram, web chat, mobile application chat, text, SMS, and MMS communications functionality, semaphore, telegram, email, voice mail, fax, radio, WhatsApp, WeChat, Facebook Messenger, Twitter, Instagram, Apple Business Chat, LinkedIn messaging, and many other social media communication channels.

Agents, or Service Representatives, or Advisors, or any other title, can refer to any user of the system that would use a tool to provide service to consumers or customers. These agents can be interfacing with the consumers or customers, or they can be completing work that does not require them to interface with consumers or customers. Agents can benefit from this routing system whether they access their work through a user interface of the system described herein, or whether they access their work in an external system that is connected to the system described herein through API or other means or remote access and control.

Administrators, or Admins, can refer to any user of the system, whether accessing the tool through a user interface or API or other remote access and control method, who has sufficient levels of permission to monitor and edit the settings that extend and adjust the routing system.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the disclosed embodiments and examples.

Flexible and Extensible Contact Center Routing Environment

FIG. 1A illustrates one embodiment of a flexible and extensible contact center environment 100. Contact center environment 100 includes a contact center data processing system 102 receiving incoming contacts from customers 1 to N (105-107) and routing the incoming contacts to agents 1 to M (108-110) for service. N and M can represent any number of customers and agents. For one embodiment, contact center data processing system 102 can include a computing architecture, as shown, e.g., in FIG. 8, having components to implement core routing module 103 and routing database 104. For one embodiment, core routing module 103 can be a combination of hardware and/or software to implement programs or program modules that perform one or more functions or operations including the disclosed flexible and extensible contact routing techniques. For one embodiment, database 104 can be any type of database including a relational database management system (RDMS).

For one embodiment, routing database 104 stores attributes for customers 1 to N, agents 1 to M, and Boolean representations used to determine or generate scores or priorities on how agents 1 to M are assigned to service customers 1 to M. For example, routing database 104 can store tables as shown, e.g., in FIGS. 2A-2F, describing attributes for customers and agents, guidelines, criteria, and Boolean representations used to determine and generate scoring pairs between agents and pair or determine priorities for servicing customers. The routing database 104 tables can be adjusted or programmed allowing for contact routing to be flexible and extensible for the changing needs of customers. For other embodiments, routing database 104 can store any number of guidelines, criteria or Boolean representations to further assist how to determine scoring pairs or set priorities for certain customers, which override a high pair score with respect to certain customers. For one embodiment, core routing module 103 can use one or more tables stored in database 104 and/or guidelines, criteria or Boolean representations to route incoming contacts from customer 1 to N to one of the agents 1 to M based on a pairing score or a priority. For example, each of the agents 1 to N can have a pairing score associated with each of the customers 1 to N, and the highest pairing score between an agent with the customers can be used to connect that agent related to a highest pairing score with a customer. For other embodiments, an override condition can exist to give priority to a particular customer regardless of a highest pairing score, e.g., a special status customer or customer in an emergency situation.

Figure 1B:
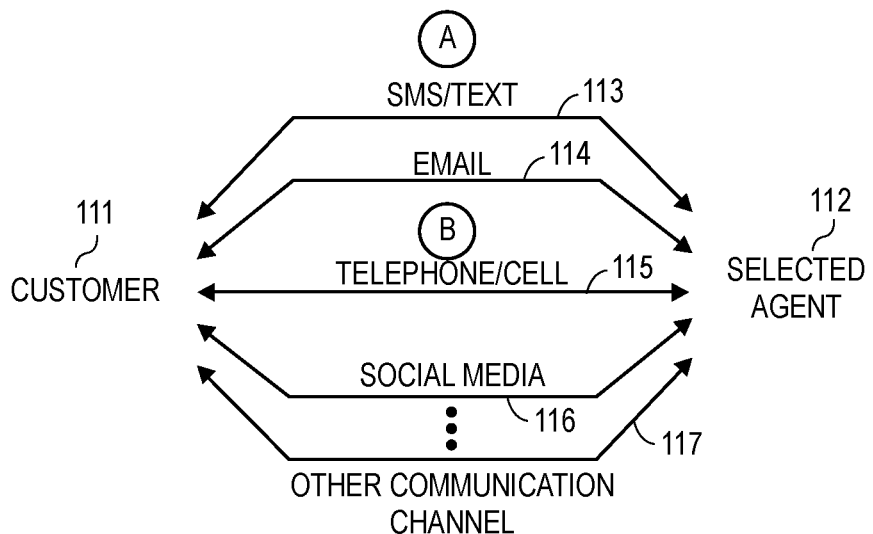
FIG. 1B illustrates one embodiment of communication channels for routing a customer to a selected agent in the contact center environment of FIG. 1A.

FIG. 1B illustrates one embodiment of communication channels 113 to 117 for routing a customer 111 to a selected agent 112 in the contact center environment 100 of FIG. 1A. For this example, communication channel 113 can represent a short message service (SMS) or text channel, communication channel 114 can represent an email channel, communication channel 115 can represent a telephone or cell channel, communication channel 116 can represent a social media channel, and communication channel 117 can represent other communication channels. For one embodiment, core routing module 103 can initially route customer 111 to selected agent 112 on a SMS/Text channel 113 represented by "A." During the service session with selected agent 112, the enhanced core routing module 103 can change the communication channel to telephone contact channel 115 represented by "B." For example, customer 111 may have started communicating with selected agent 112 on channel A in which details were cumbersome to type in on a keypad and texted selected agent 112 that he wanted to speak personally over the phone. In this case, when customer 111 contacts the contact center, core routing module 103 can be configured to know that selected agent 112 was engaged with session on a SMS/text communication channel 113 and route the contact on telephone/cell communication channel 115 directly to selected agent 112. In this way, customer service can be improved by allowing for seamless transition between communication channels at a contact center.

Agent and Customer Attributes and Scoring Pair Examples

FIG. 2A illustrates one embodiment of a routing database table 200 matching agents 201 to a customer 202 based on a highest scoring pair. Database table 200 can be stored in routing database 104. Referring to FIG. 2A, database table 200 includes a list of agents 201 identified as "1" through "5." Although five agents are listed, database table 200 can include any number of agents. For this example, each of the agents 1 through 5 is associated with a scoring pair 203 regarding customer "3"—i.e., scoring pairs of 14, 14, 12, 16 and 14 for agents 1 to 5, respectively. Based on the scoring pair, agent 4 has the highest scoring pair of "16" with respect to customer 3. As a result, in this example, core routing module 103 can route an incoming contact from customer 3 to agent 4 having the highest scoring pair 16 based on database table 200. Each pairing score 203 can be based on customer 202 attributes, agent 201 attributes, guidelines, criteria or Boolean representations. For example, customer 3 may have an attribute of speaking Spanish, and agent 4 may also have an attribute of speaking Spanish and having serviced customer 3 previously which allows agent 4 to have the highest scoring pair. The attributes for agents 201 and customer 202, guidelines, criteria or Boolean representation can be adjustable and extensible, which can be used by core routing module 103 to update or modify routing of incoming contacts from customer 3 to any of the agents 1 through 5 as contact center circumstances change or evolve. In other examples, there will be any number of customers and a respective scoring pair for each of the agents, e.g., agents 1-5. For example, there may be customers 1-20 having a scoring pair with each of the agents 1-5. This would allow the contact center to optimize for the best possible pairings across a range of customers and agents.

FIG. 2B illustrates one embodiment of a routing database table 205 showing attributes 207-209 for agents 206. Referring to FIG. 2B, agents 206 are identified as 1 to 5 having names Salvatore, Gina, Terry, Jean-Michel, and Ling. The previously contacted customer 207 attributes refer to customers serviced previously by Salvatore, Gina, Terry, Jean-Michel and Ling. In this example of attributes, Salvatore, Terry and Ling had "None," while Gina previously contacted customer 3, and Jean-Michael previously contacted customers 3 and 5. For languages(s) 208 attributes, Terry, Jean-Michel and Ling speak English only, and Salvatore speaks Spanish only, and Gina speaks both English and Spanish. And, for expertise 209 attributes, Salvatore, Jean-Michel and Ling have expertise in Products and Gina and Terry have expertise in Billing. These attributes can be used to determine scoring pairs or priorities using any number of guidelines, criteria or Boolean representations. For example, for an incoming contact by customer 3 who speaks Spanish and needs expertise in Billing, based on the attributes for agents 206, Gina would have positive results because she previously serviced this customer, speaks Spanish and has expertise. Accordingly, for customer 3, Gina can have the highest pairing score among the other agents, which can be used by core routing module 103 to route an incoming contact from customer 3 to Gina.

FIG. 2C illustrates one embodiment of a routing database table 210 showing attributes 212-218 for customers 211. In this example, there are five customers (1 to 5) having names Ingrid, Maria, Jose, Jeanette and Antoine. Attributes associated with customers 1 to 5 are channel 213, minutes waiting 214, status 215, languages 216, snowstorm 217, and issue area 218. The channel 218 attributes show that text, SMS, email, phone and phone channels are used by customers 1 to 5 for an incoming contact to contact center environment 100. The minutes waiting 214 attribute shows waiting times of 0.5, 7, 10, 15 and 4 minutes for customers 1 to 5. The status 215 attributes show status of premium, none, none, basic and none for customers 1 to 5. The languages 216 attributes show English, Spanish, English and Spanish, Spanish and English for customers 1 to 5. Snowstorm 217 attributes show no, no, yes, no and no for customers 1 to 5. And the issue area 218 attributes show billing, billing, products, billing and unknown for customers 1 to 5.

For one embodiment, a guideline, criteria or Boolean representations can be used for any one or combination of attributes 213 to 218 to determine a pairing score. For example, a guideline, criteria or Boolean representation can be if the status 215 attribute for a customer is "Premium," then that customer (i.e., customer 1, Ingrid) should be routed first regardless of wait times of the other customers and thus provide a high score. In this example, Ingrid has the shortest wait time of 0.5 minutes while Jose has waited for 10 minutes. For this contact center, status of customer may give priority over non-premium customers to premium customers. Alternatively, a contact center can make long wait times as having higher priority over short wait times regardless of the status of customer. In other examples, if a customer is in an emergency situation, e.g., snowstorm 217 attribute is Yes (e.g., Jose is impacted by a snowstorm), that customer may be given a higher scoring pair or priority over other customers. Any number of guidelines, criteria or Boolean representations can be used using any number of customer attributes 213 to 218 to determine a scoring pair or to give priority to certain customers regardless of scoring pair.

FIG. 2D illustrates one embodiment of a routing database table 220 showing scoring pairs based on customer and agent attributes of FIGS. 2B-2C. For one embodiment, core routing module 103 can process the customer and agent attributes to determine matches along any number of guidelines, criteria or Boolean representations to calculate a scoring pair of 14 between Salvatore and Jose. In this example, agent Salvatore whose attributes 221 include Agent ID as 1, previously contacted customer ID(s) as None, Language(s) as Spanish, and Expertise as Products. In this example, the matched customer is Jose whose attributes 222 include Customer ID as 3, Channel as Email, Minutes waiting as 10, Status as None, Language(s) as English and Spanish, Snowstorm Impact as Yes and Extreme, and Issue area as Products.

For one embodiment, core routing module 103 can calculate or generate pairing scores for all customers 223 such that Ingrid, Maria, Jose, Jeannette and Antoine receive scores of 2, 3, 14, 7 and 1, respectively, with respect to Salvatore as the agent. These pairing scores can be based on any of the customer or agent attributes and any combination of guidelines, criteria or Boolean representations. For example, for the high score calculation 224 of 14 for Jose, the matched attributes for Salvatore as an agent and Jose as a customer included Snowstorm Impact with a sub-score of 10, Same Language with a sub-score of 2, and Subject Matter Expertise with a sub-score of 2 which totaled 14. For this contact center, Snowstorm Impact was given a high priority of 10. For example, the contact center could be for winter equipment products and, if snowstorm impact was observed, the contact center would give the customer impacted by a snow storm a higher priority and score because it has been also identified as "extreme." For one embodiment, the communication channel of Email by Jose could be switched over to telephone or SMS text such that agent Salvatore can provide a more immediate response to meet the needs of the customer—i.e., Jose.

FIG. 2E illustrates one embodiment of a routing database table 225 showing a list of criteria and Boolean representations to match agents with customers. Referring to FIG. 2E, the criteria ID 226 include 1 to 7 referring to Names Previous Contact, Premium Status, Snowstorm Impact, Some Wait, Long Wait, Same Language and Subject Matter Expertise. The table 225 shows how the criteria are satisfied based on Boolean representations or operations and if certain attributes are indicated or present. For one embodiment, core routing logic 103 can determine if each incoming contact from a customer meets the seven criteria and Boolean representations to determine scoring pairs for matching customers to an agent.

In this example, for the Previous Contact criteria (1) to be met, the agent's previous customer ID attributes include the same customer ID related to an incoming contact. The importance criteria can be indicated as Medium. If, for example, there is a tied pairing score for all customers, any type of tie-breaking mechanism can be used, such as the customer having the longest wait time, to match the customer to the agent. For Premium Status criteria (2) to be met, customer status equals Premium. The importance of this criteria can be indicated as Low. For Snowstorm Impact criteria (3) to be met, snowstorm impact indication for the customer equals Yes. The importance of this criteria can be indicated as Extreme. For the Some Wait criteria (4) to be met, customer wait time is greater or equal to 4 minutes AND customer wait time is less than 11 minutes. The importance of this criteria can be indicated as Low. For the Long Wait criteria (5) to be met, the customer wait time must be greater or equal to 11 minutes. The importance of this criteria can be indicated as High. The importance levels can assist in determining pairing scores or weighting scores.

For the Same Language criteria (6) to be met, the customer AND agent language equals English OR customer AND agent language equals Spanish. The importance of this criteria can be indicated as Medium. For the Subject Matter Expertise criteria (7) to be met, the customer issue area AND agent area of expertise equals Billing or customer issue area AND agent area of expertise equals Products OR customer issue area AND agent area of expertise equals Tech/Website. In the above examples, the number of criteria is extensible in which additional criteria can be added. The attributes and Boolean representations can also be adjusted, modified or extended. For one embodiment, if importance to routing is Extreme, the weighting or scoring can be increased. In this example, if a customer had Previous Contact, Premium Status, Long Wait, Same Language, and Subject Matter Expertise points, the customer could be matched or paired with an agent ahead of another customer who only has the Snowstorm Impact, but no other points. In other examples, an override condition can be determined on specific Boolean conditions that can place certain customers and agents ahead of a main group.

FIG. 2F illustrates one embodiment of a routing database table 240 showing a scenario of evaluating an agent and customer pair 241 according to the criteria of FIG. 2E. For this example, the pair to evaluate 241 includes agent 1 and customer 3 based on attributes and criteria of FIGS. 2B-2E. Referring to FIG. 2F, for the seven criteria of FIG. 2E, in criteria T/F field 243, criteria 3 (Snowstorm Impact), 6 (Same Language) and 7 (Subject Matter Expertise) were met and identified as TRUE. The other criteria were not met and identified as FALSE. The score for criteria 3 is 10 and criteria 6 and 7 the score was 2 such that the total score for the agent-customer pair is 14. For this pair, the agent Salvatore received a total score of 14 with customer 3. In the temporary data store 242, attributes for the agent (Salvatore) include previously contacted customer ID (None), Language (Spanish) and Expertise (Products). And attributes for the customer (Jose) include channel (Email), minutes waiting (10 minutes), Status (None) Language(s) (English and Spanish), Snowstorm Impact (Yes) and Issue Area (Products).

Table 240 can be stored in routing database 104 in which scenarios for all the agents and customers can be saved for data analysis. As can be seen from the above examples, the customer attributes, agent attributes, guidelines, criteria and Boolean expressions and parameters are flexible such that they can be adjusted and extensible.

Exemplary Contact Center Routing Ecosystem

Figure 3A:
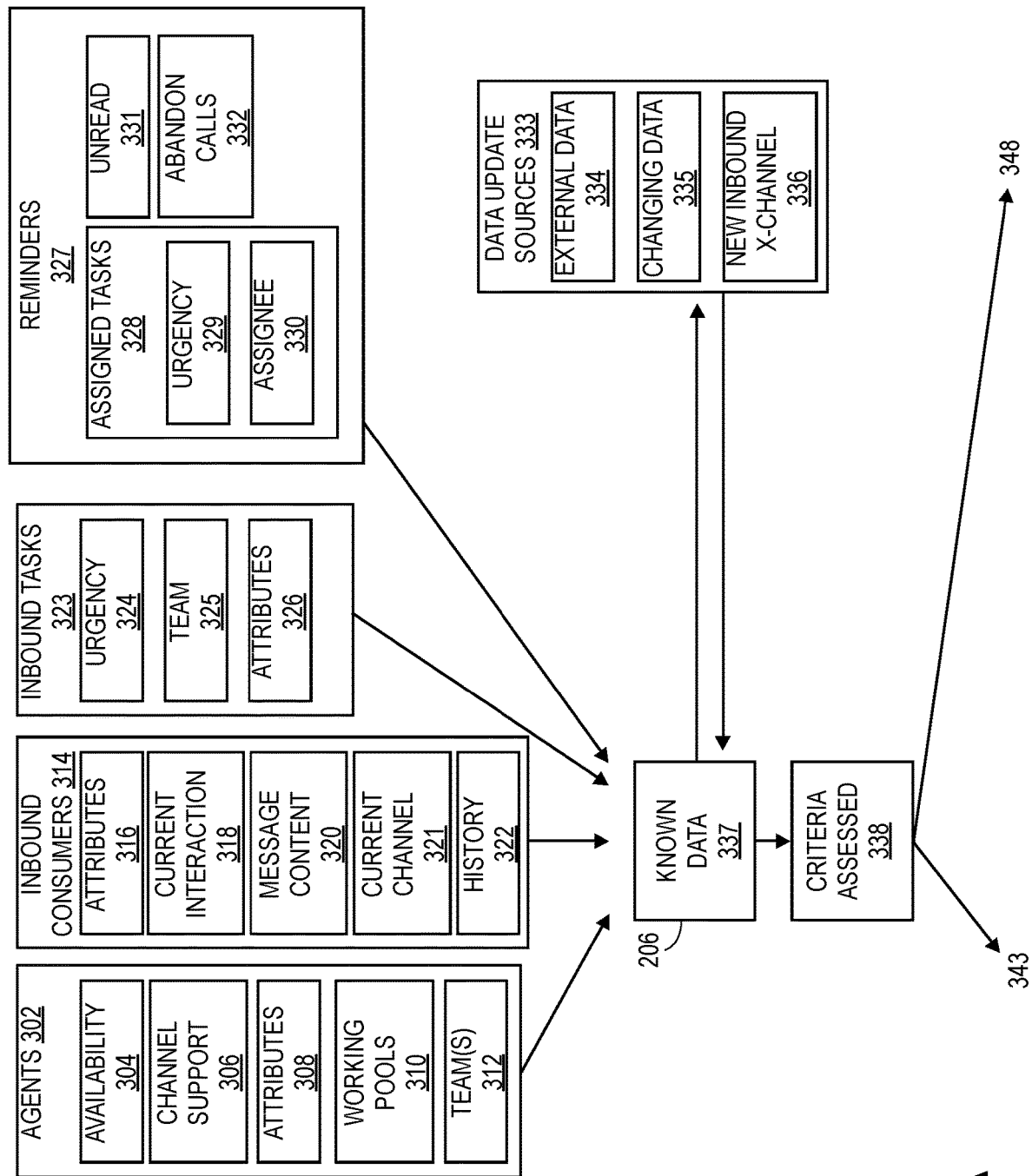
FIGS. 3A-3C illustrates one embodiment of a contact center routing ecosystem and data flow.
Figure 3B:
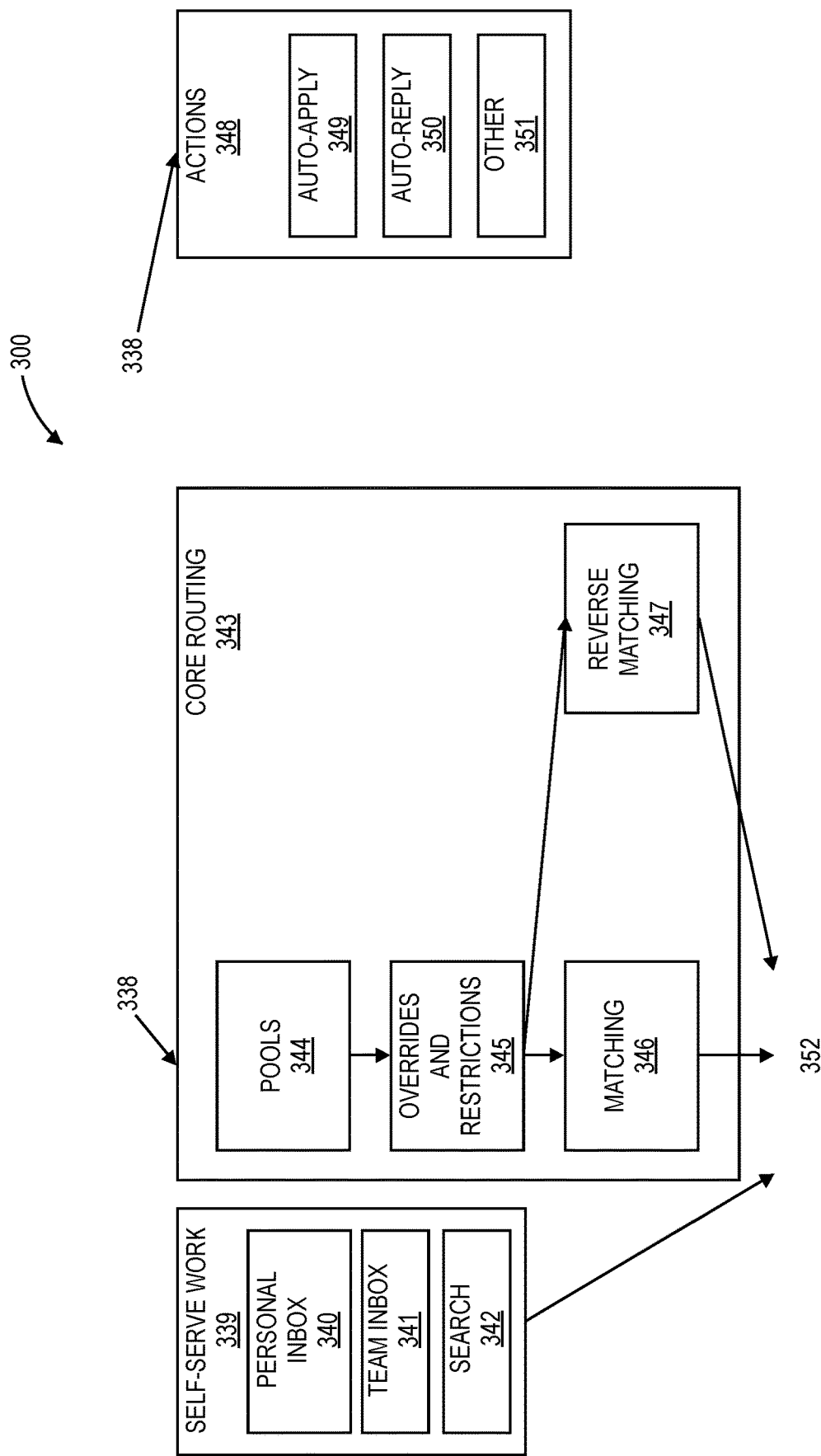
Figure 3C:
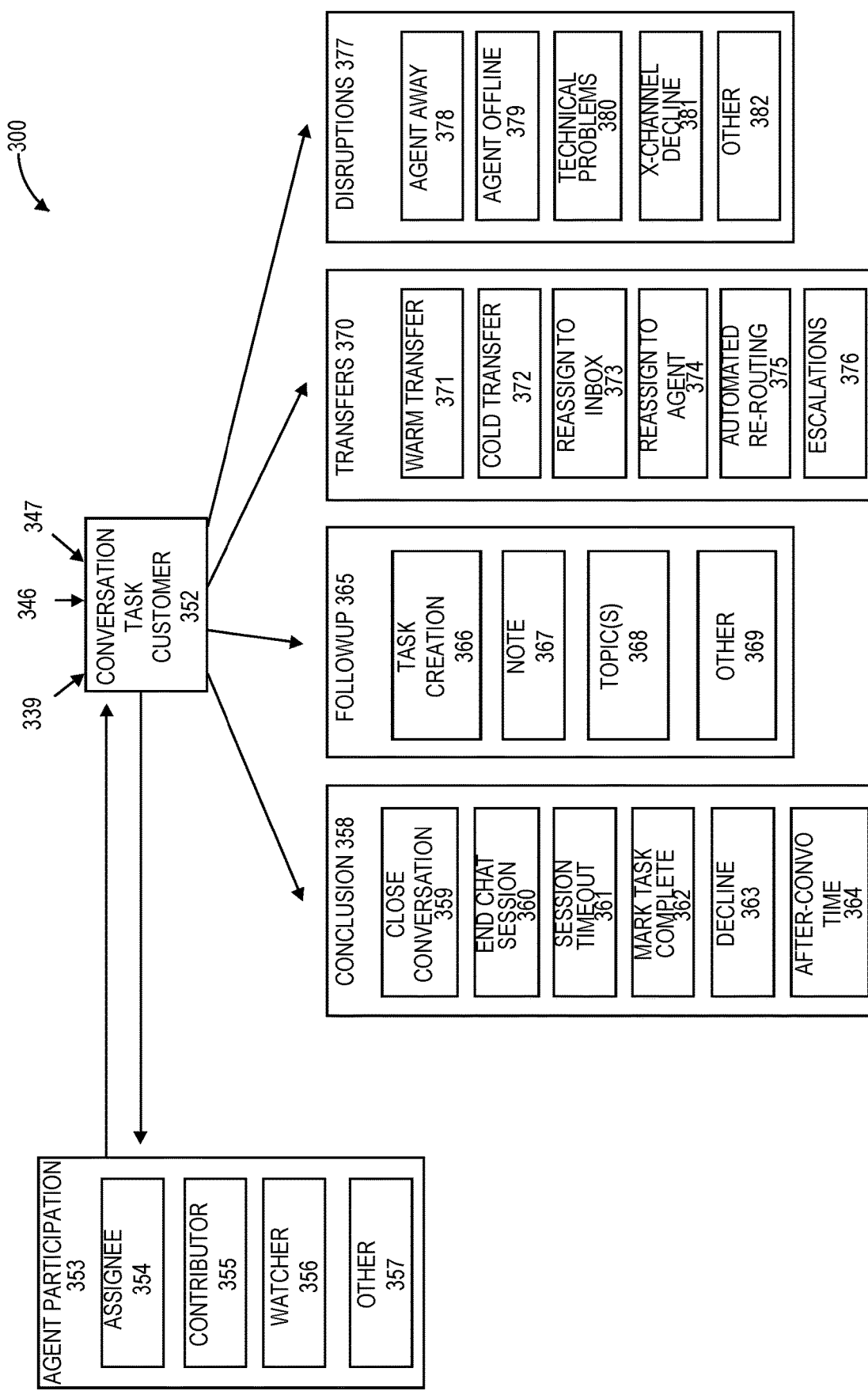

FIGS. 3A-3C illustrates embodiments of a contact center routing ecosystem 300 and data flow. Referring to FIG. 3A, data is collected (identified as known data 337) at a contact center and external to a contact center, which can be stored in a routing database, e.g., routing database 104, used for routing incoming contacts and task work. For example, the ecosystem 300 can take both inbound communications or contacts and route other types of work, e.g., such as calling a customer back or following up with an internal team to help or assist a customer issue. For one embodiment, multiple data sources within a contact center ecosystem 300 can supply information to known data 337 such as agents 302, inbound customers 314, inbound tasks 323 and reminders 327. These are just examples of data sources and other data sources can be used to supply information for known data 337 used for contact routing.

For one embodiment, agents 302 can supply multiple types of information including information related to availability 304, channel support 304, attributes 308, working pools 310 and teams(s) 312. For example, information related to availability 304 can indicate which agents are available or have capacity to service incoming communications. Information related to channel support 306 can indicate which channels agents are working on, e.g., email, telephone, SMS/Text channels, etc. Information related to attributes 308 can indicate attributes such as languages (e.g., Spanish), area of expertise (e.g., Products) and etc. related to agents 302. Information related to working pools 310 can indicate pools in which agents 302 work in such as different departments within an enterprise or company. Information related to team(s) 313 can indicate which agents 302 work on which teams, e.g., Western Regional Team, Operations Team, etc.

For one embodiment, inbound customers 314 can supply multiple types of information to known data 337 including information related to attributes 316, current interaction 318, message content 320, current channel 321 and history 322. For example, information related to attributes can indicate attributes of customers 314 such as language (e.g., Spanish), premium customer and etc. Information related to current interaction 318 can include a current interaction with the contact center, e.g., related to Billing, how long the customer has been waiting and etc. Information related to message content 320 can include what language the communication is in, whether the content has a negative sentiment or etc. Information related to current channel 321 can indicate which channel the customer is being serviced on, e.g., SMS channel, and what channels are available to service the customer. Information related to history 322 can include how many times a customer has contacted the enterprise or company recently, and how satisfied they were with previous interactions, and etc.

For one embodiment, inbound tasks 323 can supply multiple types of information to known data 337 including information related to urgency 324, team 325 and attributes 326. Information related to urgency can place a priority on an inbound task related to customers 314 and agents 302. Information related to team 325 can indicate the agents in a team who should service the input tasks 323. Information related to attributes 326 can include what type of task needs to be completed, e.g., Redress fraudulent transaction.

For one embodiment, reminders 327 can supply multiple types of information to known data 337 including information related to assigned tasks 328, which includes information related to urgency 329 and assignee 330, and information related to unread reminders 331 and abandoned contacts 332. Information related to assigned tasks 328 can indicate if a task is urgent or non-urgent or have other priorities using information related to urgency 329 and information related to assignee can indicate which agent or agents is assigned to a task. Information related to unread 331 indicates if an inbound message has been read or reviewed by any of agents 302. Information related to abandoned contacts 332 can indicate which contacts were abandoned and a reason for a contact being abandoned, e.g., customer dropped contact, so that agents can determine how to best reengage with customers, etc.

For one embodiment, known data 337 is coupled to data update sources 333. Known data can update data from data update sources 333 or store some or all of the information in known data 337 as a cache. For other embodiments, data update sources 333 can supply multiple types of information to known data 337 including information related to external data 334, changing data 335 and new inbound x-channel 336 (cross-channel) used for modifying or updating information in known data 337. Information related to external data 334 can include updating customer attributes 316 from an external data source, e.g., refreshing the customer's latest banking transaction history. Information related to changing data 335 can be any type of data that is changing as the interaction unfolds, e.g., the time that a customer is waiting 318 or the channels 306 that an agent is available to service. Information related to new inbound x-channel 336 can indicate if customer or agent initiates additional communication over a new channel, e.g., when an inbound customer 314 reaches out by phone to start and then also reaches out on social media channels.

For one embodiment, core routing module 103 can implement criteria assessed 338 using known data 337 to route contacts at a contact center. Criteria assessed 338 can include Boolean representations or statements using attributes 308 for agents 302 and attributes 317 for inbound customers 314 or other information and guidelines from known data 337. Criteria assessed 338 can also determine scores for matching agents 302 to inbound customers 314. For other embodiments, criteria assessed 338 can provide guidelines to choose pools of agents 302 to service inbound customers 314, provide overrides or restrictions while matching agents 302 to customers 314, provide auto-reply rules, apply topics to the interaction, or trigger other rules for any issue matching agents 302 to inbound customers 314. Outputs and information from criteria assessed 338 are forwarded to core routing 343 and parallel actions 348 as shown in FIG. 3B.

FIG. 3B is a continuation of the contact center ecosystem 300 shown in FIG. 3A. Referring to FIG. 3B, core routing 343 receives or uses information from criteria assessed 338, which includes functions related to pool 344, overrides and restrictions 345, matching 346 and reverse matching 347. Functions related to pool 344 perform tasks in distinct parts at a contact center or distinct parts of an organization such as region, brands, product types etc. Functions related to overrides and restrictions 345 can override matches between customers to a particular available agent or place restrictions on agents to which types of customers to service. For one embodiment, overrides and restrictions 345 can be prioritized for a small pool of customers, e.g., Premium. For one embodiment, overrides and restrictions 345 can limit the pool of customers who an available agent can match with, e.g., negative comments regarding the available agent, by one or more customers in the pool.

For one embodiment, functions related to matching 346 can implement a first-to-respond approach. For example, when an agent becomes available, matching 346 can assess possible matches based on attributes, Boolean representations, scores, criteria, guidelines, rules and priorities using techniques disclosed herein in order to match a customer with the best available agent. Reverse matching 347 can perform functions in the case when there are more agents than incoming tasks or contacts (e.g., conversations, tasks etc.). For example, when a customer contacts the contact center, reverse matching 347 can assess each possible agent match and pair the customer with the best agent.

For one embodiment, actions 348 can be performed at a contact center that receives information from criteria assessed 338 shown in FIG. 3A. In one embodiment, actions 348 can include functions such as auto-apply 349, auto-reply 350 or other 351. Auto-apply 349 can apply topics to the interaction for reporting purposes. Auto-reply 350 can provide auto-reply messages if there are no available agents via the communication channel used by the customer, e.g., email, SMS/text messaging, chat etc. Other functions 351 can include future actions that would be triggered from criteria assessed 338.

For one embodiment, self-serve work 339 can be performed along with core routing 343 and parallel actions 348. Self-serve work 339 can be implemented by agents directed to functions related to personal inbox 340, team inbox 341 and search 342. For example, customer contacts may be directed to a personal inbox 340 of an agent or a team inbox 341 in which messages can be addressed and communicated within personal inbox 340 and team inbox 341. An agent can also implement a search 342 such as searching data on a particular customer or recent messages from a customer etc. Conversation task customer 352, as shown in FIG. 3C, receive inputs from core routing 343 and self-serve work 393.

FIG. 3C is a continuation of the contact center ecosystem 300 shown in FIGS. 3A-3B. Referring to FIG. 3C, conversation-task-customer 352 operation assigns or pairs customers or tasks to agents. For example, a conversation for an incoming customer is assigned to an agent based on operations from core routing 342 and/or self-serve work 339. Agent participation 353 interacts with conversation task customer 352 which includes assignee 354, contributor 355, watcher 356 and other functions during the conversation with a customer. Regarding the conversation with a customer, conversation task customer 352 can then lead to operations such as conclusion 359 operations, follow-up 365 operations, transfer 370 operations, and disruptions 377 operations.

For one embodiment, conclusion operations 358 includes functions such as close conversation 359, end chat session 360, session timeout 361, mark task complete 362, decline 363 and after-conversation time 364. Other functions can be implemented and the above examples are not limiting. For one embodiment, follow-up operation 365 includes functions such as task creation 366, note 367, topic(s) 368, and other 369, which can be implemented by an agent for follow-up actions. For one embodiment, transfers 370 operations include functions such as warm transfer 371, cold transfer 372, reassign to inbox 373, reassign agent 374, automated re-routing 375 and escalations 376, which can be implemented by one or more agents or system functions. For one embodiment, disruptions 377 operations include functions to provide indications to a customer such as agent away 378, agent offline 379, technical problems 380, cross channel (x-channel) or communication channel decline 381 or other 382.

Exemplary Agent Interfaces

FIGS. 4A-4B illustrates one embodiment of screen shots 400 and 410 of administration interfaces for setting up communications with customers on multiple communication channels. Referring to FIG. 4A, for one embodiment, screen shot 400 shows an interface for an administrator for contacts that may be provided by the company to enable incoming communication via an email channel. More specifically, these emails are email addresses that the company owns and publishes on their website for people to contact them. For instance, a company might have an email help@dogs.com, veterinarians@dogs.com, billing@dogs.com, etc. The company would put those email addresses here, and connect them to Pools as described above (see FIG. 3B) and as Mapping Rules in FIG. 11. Communications received via these email addresses can be routed to an agent, a pool of agents, or a team of agents.

For one embodiment, screen shot 400 shows a list of email entry points 401 to a contact center. For example, the first entry indicates an email to World Reservations at a contact center. A name field 402 is provided in the interface for an administrator to enter a name for the entry point email. The inbox 403 indicates an email for a group of agents working on the World Reservations Inbox and a field 404 an SLA response time to service the email and for the first entry an SLA response time is 1440 minutes.

Referring to FIG. 4B, the screen shot 410 is a continuation of screen shot 400. For example, the top part of screen shot 410 continues with email entry points with a name field, in box and SLA response time in minutes. Screen shot 410 also shows another communication channel for phone 406 that identifies the phone numbers at entry point 401 that customers dial to connect with the contact center. When the contact center is in use, the inbox 403 includes a contact to si-voice-test automation having an SLA wait time 1440 minutes. In this situation, an agent may override all other contacts and may end up using a contact specified here because of the long wait time. Alternatively, core contact 104 routing may ignore long wait times if the customer from the incoming contact at entry point +11234567891 is a Premium customer and the contact center services Premium customers with the highest priority.

Exemplary Interfaces for Adjusting Rules and Criteria for Contact Routing

FIG. 5 illustrates one embodiment of a screen shot 500 of rules or criteria for matching customers to agents. For this example, an interface allows a Boolean representation to be created, modified or adjusted and allows the rules or criteria to be extensible. The example Boolean representation 501 is shown as, e.g., for a rule or criteria when an Email is received for a new an ongoing conversation AND meets all the conditions of:

Email is from johndoe@anyemail.com
AND
Email subject contains Sam.

For this interface an "Add" function is provided such that a user or agent or administrator can add new rules. The Boolean representation can also be modified or adjusted. In this example, if the rule or criteria is met, then there are options for the actions that should be taken 502. For example, Topics can be added, was conversation negative, send Auto-reply, choose an answer or select other options.

Figure 6:
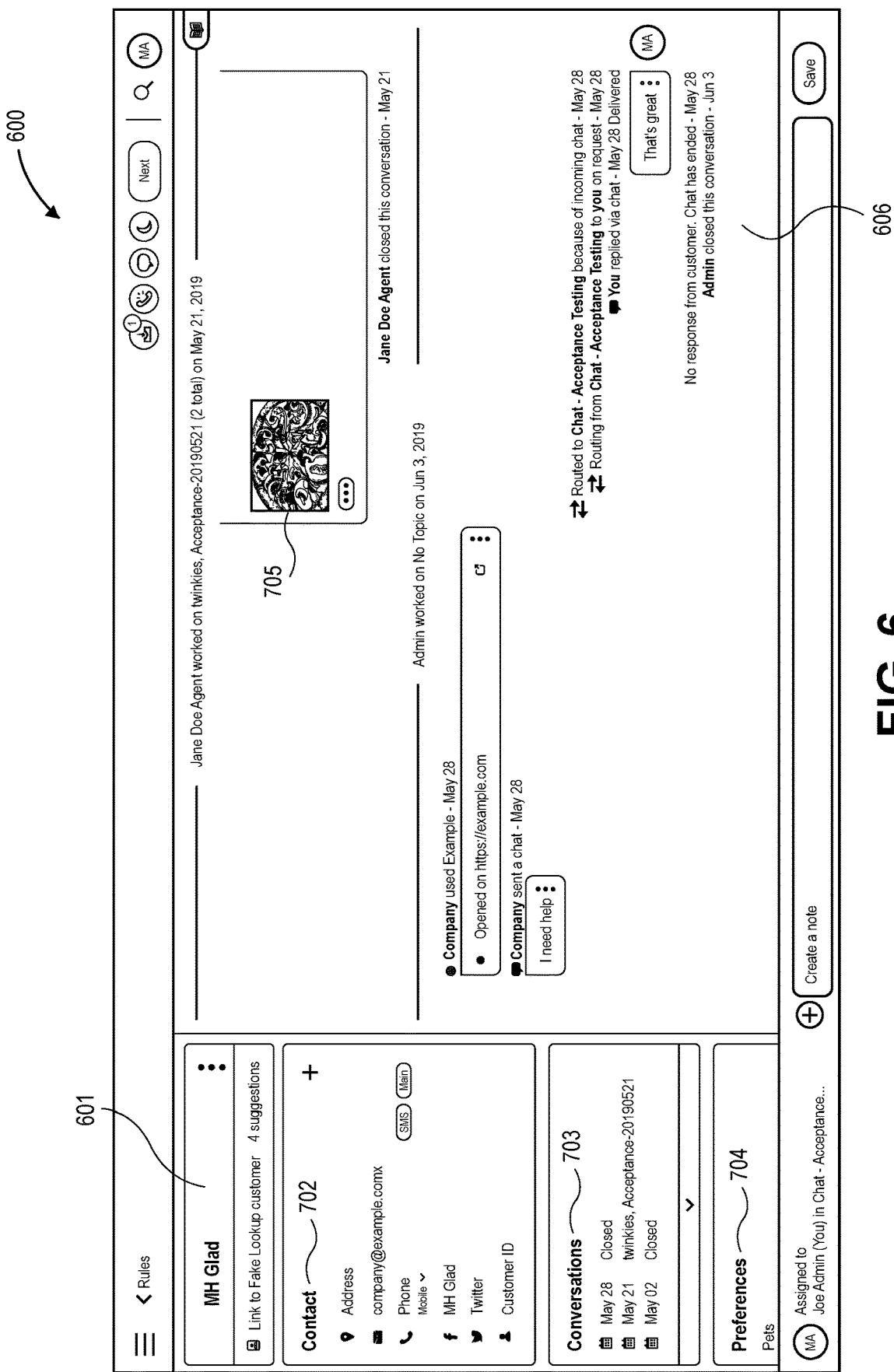
FIG. 6 illustrates another embodiment of a screen shot of an agent interface for helping customers after a rules or criteria match.

FIG. 6 illustrates another embodiment of a screen shot 600 of an interface after a rules or criteria match. This interface is for agent Jane Doe to help customer Company. Once a rule or criteria has been met, e.g., as shown in FIG. 5, the interface as shown in FIG. 6 can be provided to an agent. For example, the agent matched is identified as Jane Doe. For this customer, in the conversations window 603, there have been previous conversations on May 2, 21 and 28 with the agent Jane Doe. Windows 605 and 606 shows the previous conversations with Jane Doe with the customer.

Data Processing System or Computing System Architecture

Figure 7:
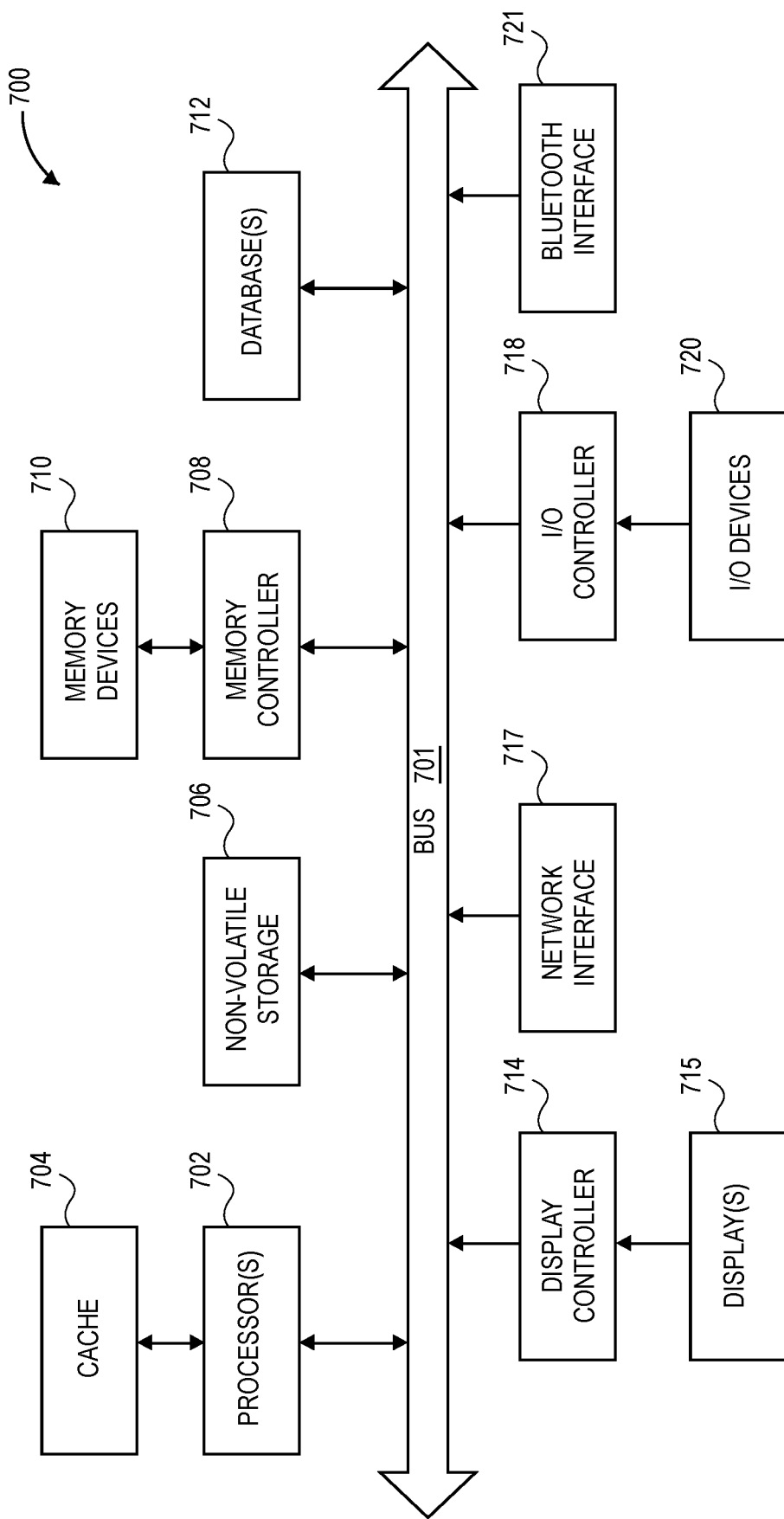
FIG. 7 illustrates one embodiment of a block diagram of data processing system or computing system architecture to implement the enhanced contact routing between customers and agents.

FIG. 7 illustrates one embodiment of a block diagram of a data processing system or computing system architecture 700 to implement the flexible and extensible contact routing techniques disclosed herein. The data processing system 700 can represent the various components for contact center data processing system 102 disclosed in FIG. 1A. Although FIG. 7 illustrates various components of a data processing system, the components are not intended to represent any particular architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

Referring to FIG. 7, data processing system 700, which is a form of a computing system, includes a bus 701, which is coupled to processor(s) 702 coupled to cache 704, display controller 714 coupled to a display 715, network interface 717, non-volatile storage 706, memory controller 708 coupled to memory 710, I/O controller 718 coupled to I/O devices 720, and database 712. Processor(s) 702 can include one or more central processing units (CPUs), graphical processing units (GPUs), a specialized processor or any combination thereof. Processor(s) 702 can retrieve instructions from any of the memories including non-volatile storage 706, memory 710, or database 712, and execute the instructions to perform operations described in FIGS. 1A-6. Database 712 can also represent a routing database 104 and processor(s) 802 can implement core routing module 103 shown in FIG. 1A.

Examples of I/O devices 720 include mice, keyboards, printers and other like devices controlled by I/O controller 718. Network interface 717 can include modems, wired and wireless transceivers and communicate using any type of networking protocol including wired or wireless WAN and LAN protocols including LTE and Bluetooth interface and an API interface to communicate with Bluetooth devices. Data processing system 700 can also include a Bluetooth interface 721 that provide Bluetooth communication with Bluetooth devices. Memory 710 can be any type of memory including random access memory (RAM), dynamic random-access memory (DRAM), which requires power continually in order to refresh or maintain the data in the memory. Non-volatile storage 706 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

For one example, memory devices 710 or database 712 can store customer attributes, agent attributes and Boolean representations for flexible and extensible contact routing. Although memory devices 710 and database 712 are shown coupled to system bus 701, processor(s) 702 can be coupled to any number of external memory devices or databases locally or remotely by way of network interface 717 or Bluetooth interface 721, e.g., database 712 can be secured storage in a cloud environment.

Embodiments and examples disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 702) to implement the techniques and operations disclosed herein for a flexible and extensible contact center routing.

Exemplary Contact Center Routing Operations

Figure 8:
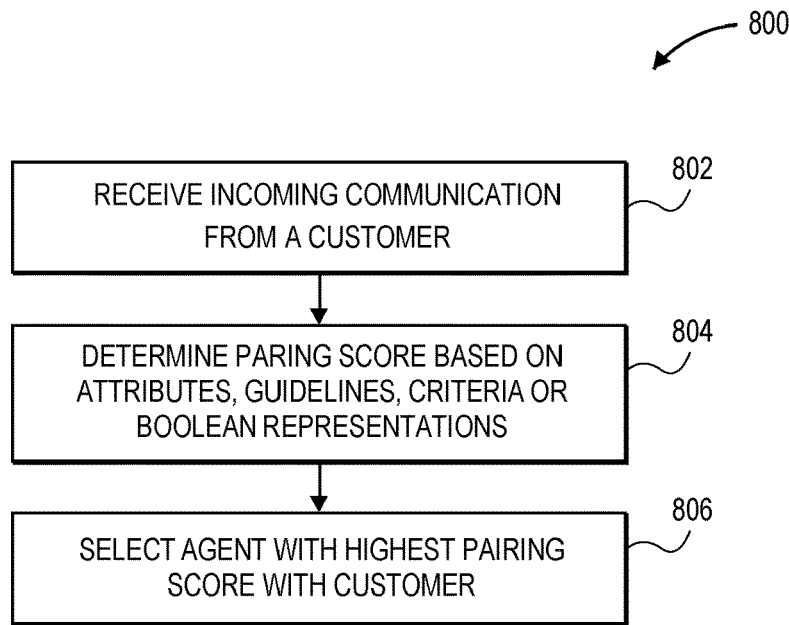
FIG. 8 illustrates one embodiment of a flow diagram of an operation for routing contacts at a contact center.
Figure 9:
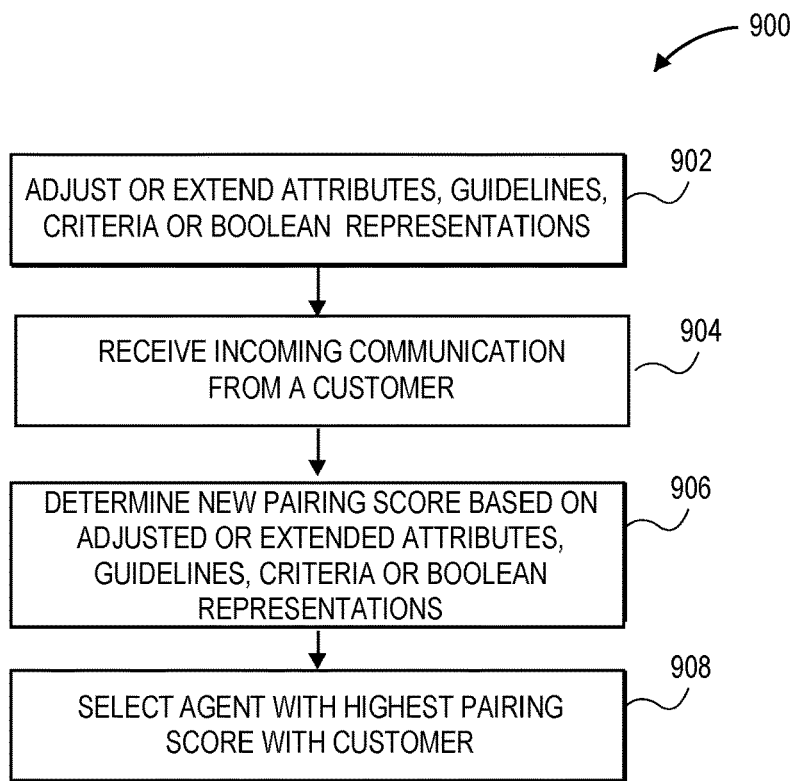
FIG. 9 illustrates another embodiment of a flow diagram of an operation for routing contacts at a contact center.
Figure 10:
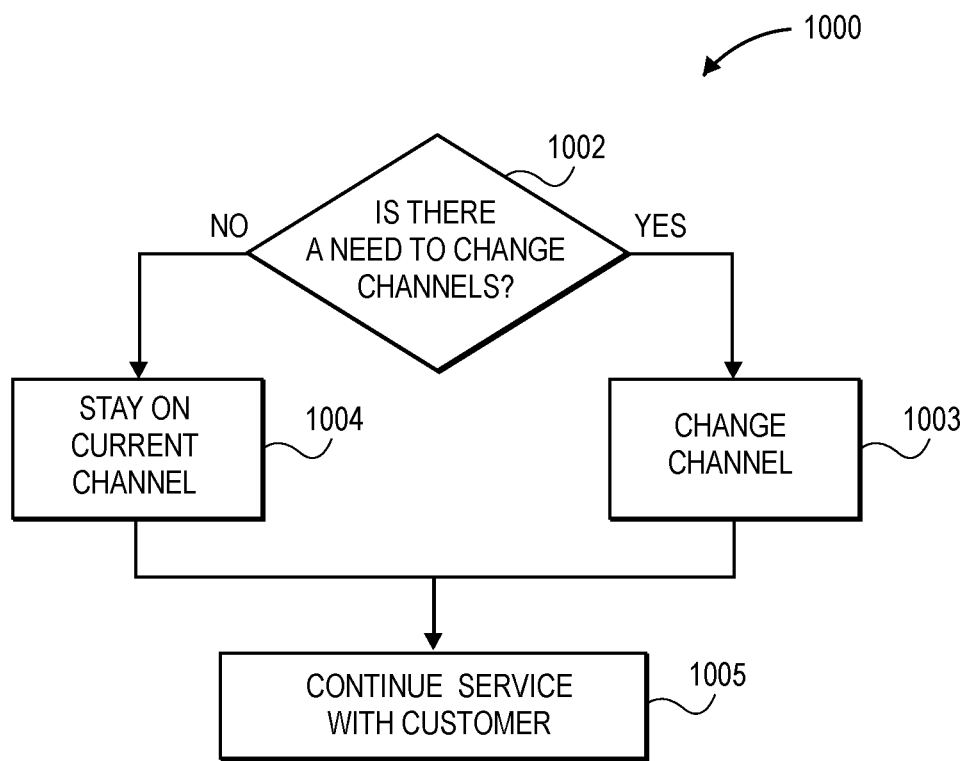
FIG. 10 illustrates one embodiment of a flow diagram of an operation for changing communication channels.

FIGS. 8-10 illustrate exemplary embodiments of operations 800, 900 and 1000 for routing incoming communications or contacts at a contact center. The following operations can be implemented by the contact center data processing system 100 of FIG. 1A in the contact center ecosystem 300 of FIGS. 3A-3C. Operations 800, 900 and 1000 can be implemented according to the contact routing techniques described in FIGS. 1A-7.

FIG. 8, illustrates one embodiment of a flow diagram of operation 800 for routing work or inbound communications or tasks at a contact center. Operation 800 includes operation blocks 802 to 806.

At operation block 802, an incoming communication is received at a contact center from a customer.

At operation block 804, a pairing score is determined based on attributes, guidelines, criteria or Boolean representations.

At operation block 806, an agent is selected with the highest pairing score with the customer. After selection of the agent, the contact center routes the incoming communication or the work to the selected agent.

FIG. 9 illustrates another embodiment of a flow diagram of operation 900 for routing work or incoming communications or tasks at a contact center. Operation 900 includes operation blocks 902 to 908.

At operation block 902, attributes, guidelines, criteria or Boolean representations are adjusted or extended.

At operation block 904, an incoming communication is received at a contact center from a customer.

At operation block 906, a pairing score is determined based on adjusted or extended attributes, guidelines, criteria, or Boolean representations.

At operation block 908, an agent is selected with the highest pairing score with the customer. After selection of the agent, the contact center routes the incoming communication or the work to the selected agent.

For the above example operations 800 and 900, routing can occur only when a new communication is initiated from a customer, and need not occur for each communication sent by a customer. For example, if a customer sends a SMS communication, the session can be routed to an agent using the disclosed routing techniques. If the customer sends successive SMS communications, the communication can go directly to the same agent servicing the customer without having to go through the above routing process.

FIG. 10 illustrates one embodiment of a flow diagram of operation 1000 for changing communication channels at a contact center. Operation 1000 includes operation blocks 1002 to 1005.

At operation block 1002, a determination is made if there is a need to change communication channels.

At operation block 1003, if the determination is Y, the current communication channel is changed to another communication channel and continues to block 1005 to continue service with a customer.

At operation 1004, if the determination is N, there is no change and the agent stays on the current communication channel and continues to block 1005 to continue service with a customer.

Additional Routing Interface Examples

Figure 11:
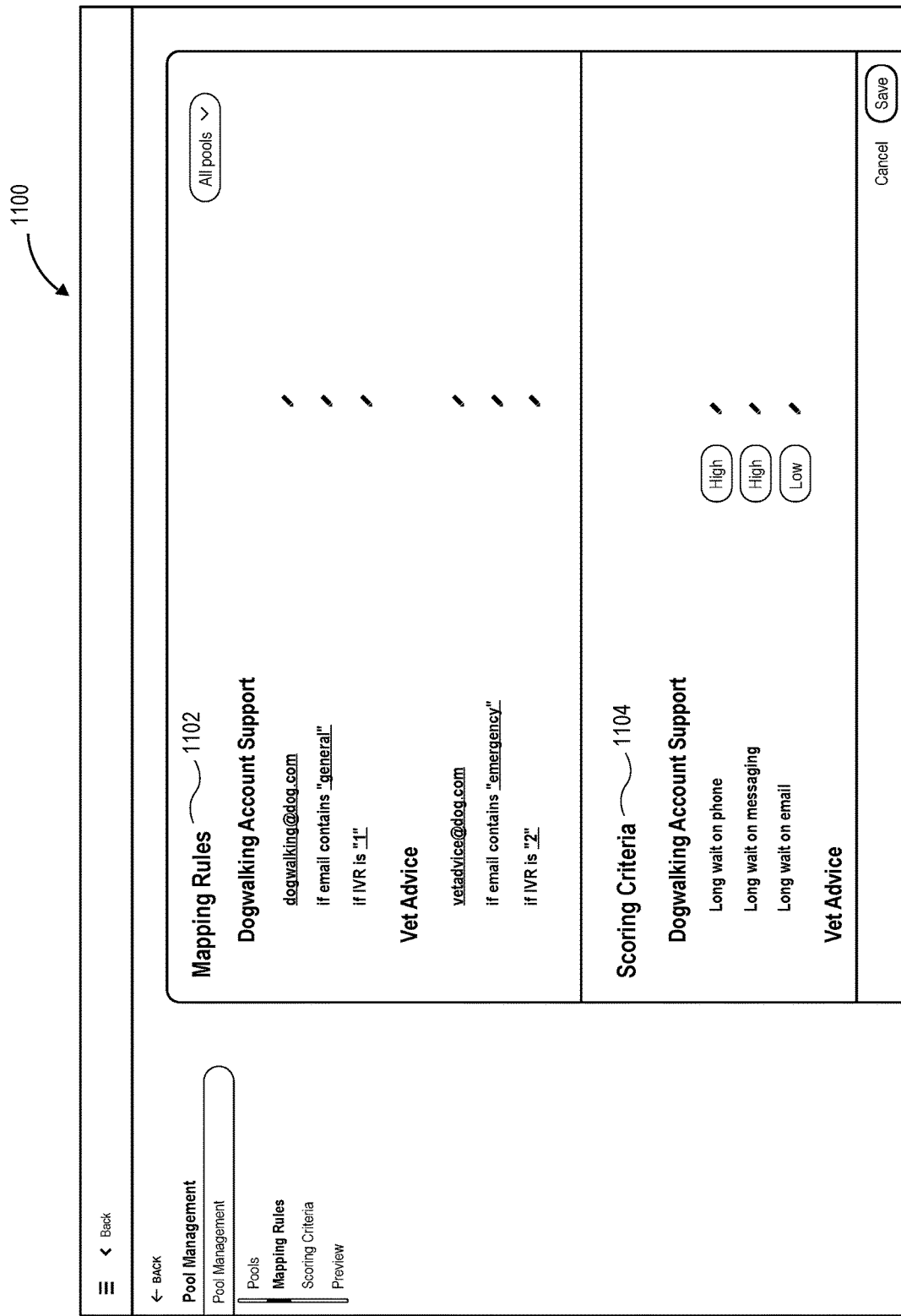
FIG. 11 illustrates one embodiment of an administration interface for providing mapping rules and scoring criteria.
Figure 12:
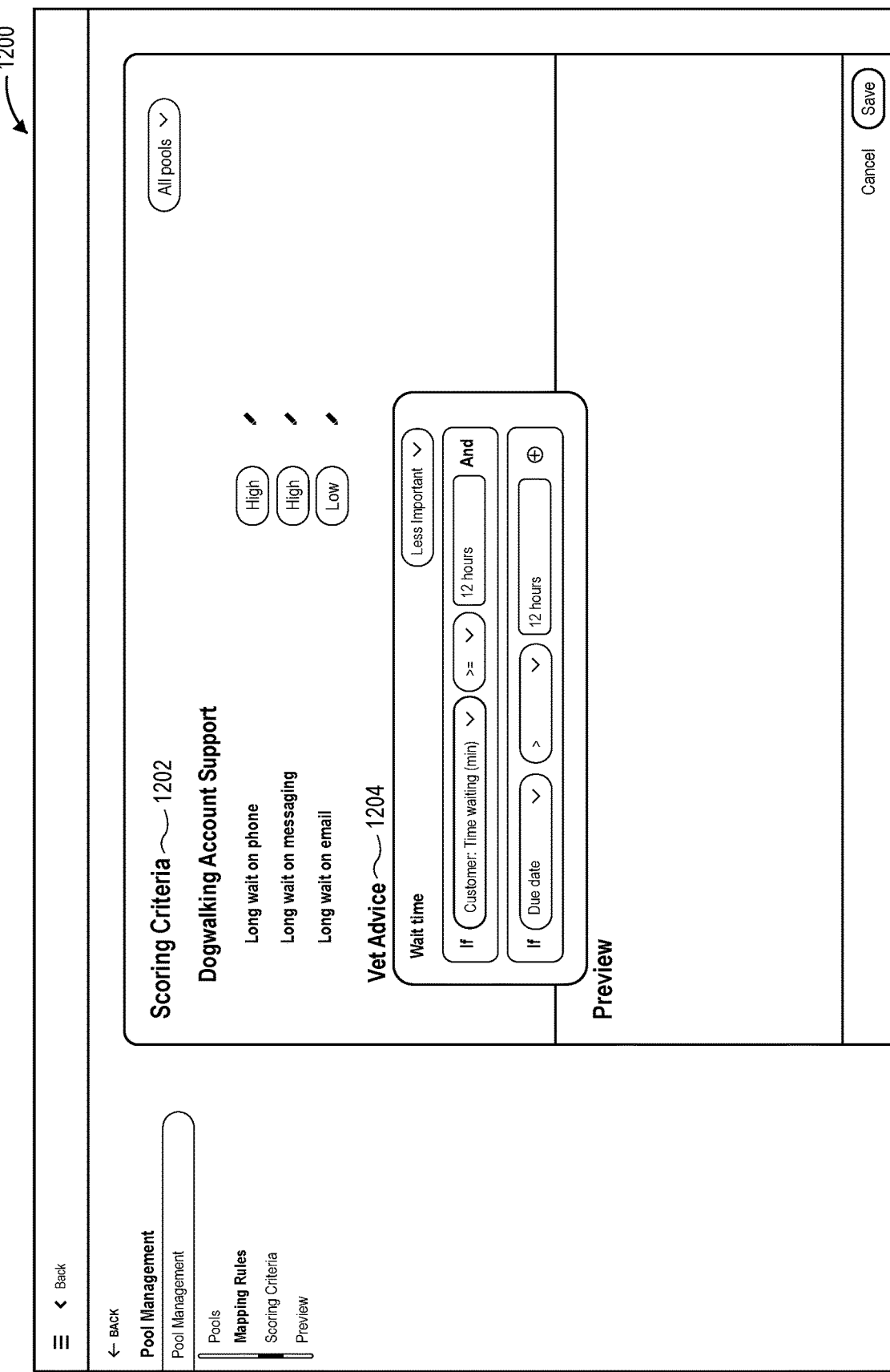
FIG. 12 illustrates one embodiment of an administration interface for providing scoring criteria for an exemplary account.
Figure 13:
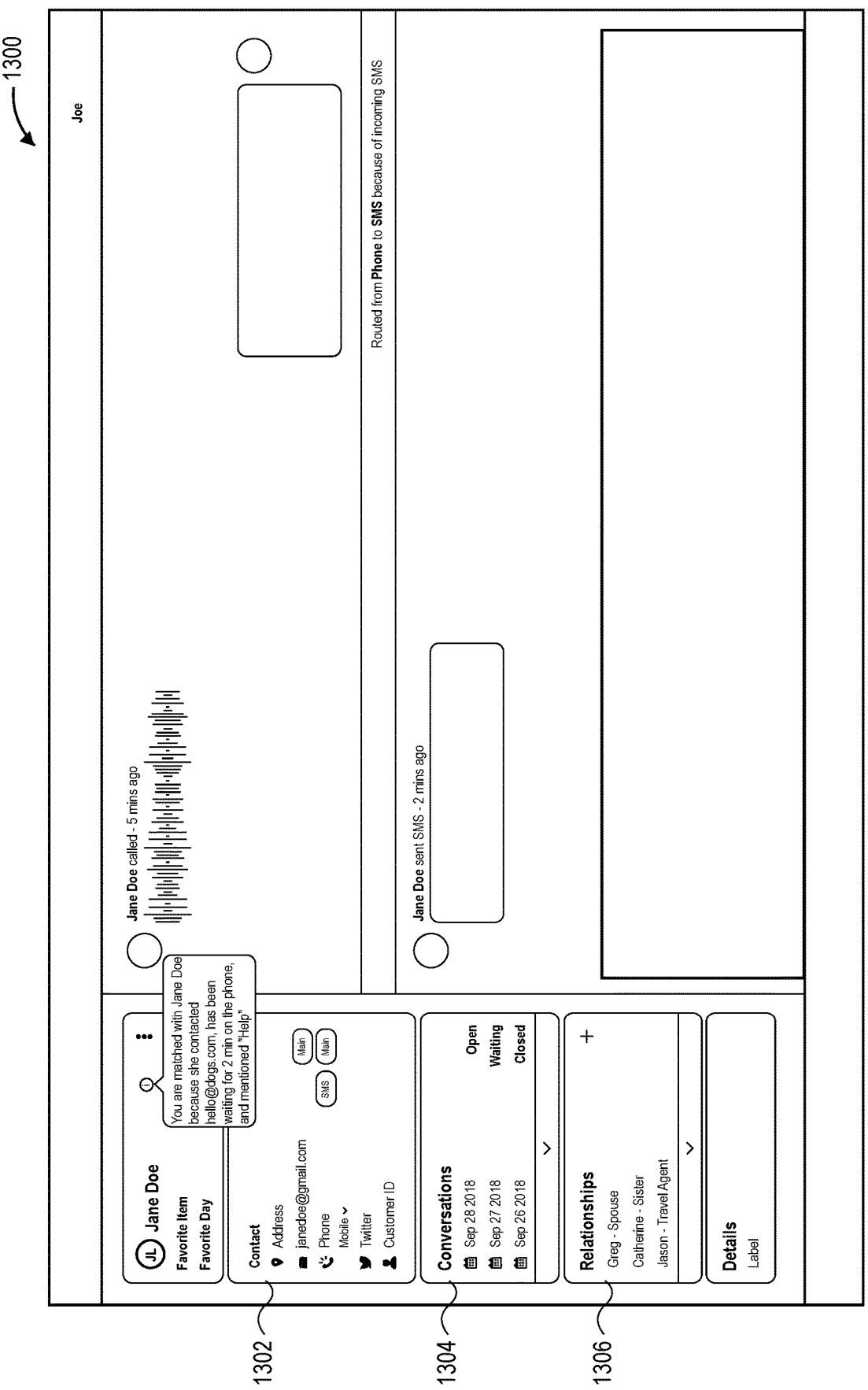
FIG. 13 illustrates one embodiment of an interface for an agent to help customers across multiple channels.

FIGS. 11-13 show additional routing interface examples for the routing techniques disclosed herein. Referring to FIG. 11, an administration interface 1100 is shown for providing mapping rules and scoring criteria according to one embodiment. Interface 1100 includes mapping rules 1102 which can identify parameters to define mapping rules 102. In this example, there are parameters for dogwalking and vet advice. Interface 1100 includes scoring criteria 1104 to assist in determining scoring. Parameters such as long wait on phone or messaging can be classified as "High," which can be provided with a higher score in determining a pair scoring between an agent and customer. Referring to FIG. 12, an interface 1200 for providing scoring criteria is shown for an exemplary account according to one embodiment. Interface 1200 includes scoring criteria 1202 that provides a window 1204 for Vet advice having Boolean inputs on how to classify parameters to determine scoring. A section for preview 1206 is also shown. Referring to FIG. 13, an agent interface 1300 is shown according to one embodiment. Interface 1300 includes contact 1302, conversation 1304, and relationships sections 1305 for an agent to interface with customers.

In the foregoing specification, the invention has been described with reference to specific exemplary embodiments thereof. It will, however, be evident that various modifications and changes may be made thereto without departing from the broader spirit and scope of disclosed embodiments. The specification and drawings are, accordingly, to be regarded in an illustrative rather than a restrictive sense.

What is claimed is:

1. A method for a contact center, performed by a communication routing system, comprising:
   creating, modifying, adjusting or extending, by one or more agents or administrators of the contact center, one or more customer attributes, agent attributes, rules or criteria for determining pairing scores and routing incoming communications from customers to agents, to customize the communication routing system to the contact center;
   receiving incoming communications from one or more customers;
   determining a pairing score for each agent selectable for servicing the incoming communications with each of the one or more customers based on characteristics of the incoming communications and on the adjustable and extensible customer attributes, agent attributes, rules and criteria; and
   routing an incoming communication from a customer to an agent based on such pairing scores, including at least one pairing score that is determined after receiving the incoming communication from the customer based on data about each of the customer and the agent determined in real-time after the incoming communication occurs.

2. The method of claim 1 wherein one or more pairing scores are set based on attributes of a customer-agent pairing and at least one other customer-only attribute.

3. The method of claim 1 wherein routing the incoming communication from the customer to the agent is based on customer priority set for and/or by the contact center.

4. The method of claim 1 wherein routing the incoming communication from the customer to the agent based on such pairing scores is also based on one or more override conditions indicating the pair scores should be overridden, and further comprising:
   determining the one or more override conditions exist;
   determining routing for the incoming communication from a customer to an agent without regard to such pairing scores; and
   routing the incoming communication from the customer to the agent.

5. The method of claim 4 wherein determining the one or more override conditions exist is based on combining conditions via Boolean or other logic operation to prioritize a certain customer and/or agent over other customers and/or agents when determining the routing.

6. The method of claim 5 wherein at least one override of the one or more overrides is set by the contact center.

7. A data processing system for a contact center comprising:
   a routing database storing one or more customer attributes and agent attributes; and
   a core routing module coupled to the routing database and configured to create, modify, adjust or extend, by one or more agents or administrators of the contact center, one or more customer attributes, agent attributes, rules or criteria for determining pairing scores and routing incoming communications from customers to agents, to customize the communication routing system to the contact center;
   receive incoming communications from one or more customers;
   determine a pairing score for each agent selectable for servicing the incoming communications with each of the one or more customers based on characteristics of the incoming communications and on the adjustable and extensible customer attributes, agent attributes, rules and criteria; and
   route an incoming communication from a customer to an agent based on such pairing scores, including at least one pairing score that is determined after receiving the incoming communication from the customer based on data about each of the customer and the agent determined in real-time after the incoming communication occurs.

8. The data processing system of claim 7 wherein one or more pairing scores are set based on attributes of a customer-agent pairing and at least one other customer-only attribute.

9. The data processing system of claim 7 wherein routing the incoming communication from the customer to the agent is based on customer priority set for and/or by the contact center.

10. The data processing system of claim 7 wherein routing the incoming communication from the customer to the agent based on such pairing scores is also based on one or more override conditions indicating the pair scores should be overridden, and further comprising:
    determining the one or more override conditions exist;
    determining routing for the incoming communication from a customer to an agent without regard to such pairing scores; and
    routing the incoming communication from the customer to the agent.

11. The data processing system of claim 10 wherein determining the one or more override conditions exist is based on combining conditions via Boolean or other logic operation to prioritize a certain customer and/or agent over other customers and/or agents when determining the routing.

12. The data processing system of claim 11 wherein at least one override of the one or more overrides is set by the contact center.

13. A non-transitory computer-readable medium containing instructions, which if executed by a data processing system, cause the data processing system to implement an operation comprising:
    creating, modifying, adjusting or extending, by one or more agents or administrators of the contact center, one or more customer attributes, agent attributes, rules or criteria for determining pairing scores and routing incoming communications from customers to agents, to customize the communication routing system to the contact center;
    receiving incoming communications from one or more customers;
    determining a pairing score for each agent selectable for servicing the incoming communications with each of the one or more customers based on characteristics of the incoming communications and on the adjustable and extensible customer attributes, agent attributes, rules and criteria; and
    routing an incoming communication from a customer to an agent based on such pairing scores, including at least one pairing score that is determined after receiving the incoming communication from the customer based on data about each of the customer and the agent determined in real-time after the incoming communication occurs.

14. The non-transitory computer-readable medium of claim 13 wherein one or more pairing scores are set based on attributes of a customer-agent pairing and at least one other customer-only attribute.

15. The non-transitory computer-readable medium of claim 13 wherein routing the incoming communication from the customer to the agent is based on customer priority set for and/or by the contact center.

16. The non-transitory computer-readable medium of claim 15 wherein routing the incoming communication from the customer to the agent based on such pairing scores is also based on one or more override conditions indicating the pair scores should be overridden, and further comprising:
    determining the one or more override conditions exist;
    determining routing for the incoming communication from a customer to an agent without regard to such pairing scores; and
    routing the incoming communication from the customer to the agent.

17. The non-transitory computer-readable medium of claim 16 wherein determining the one or more override conditions exist is based on combining conditions via Boolean or other logic operation to prioritize a certain customer and/or agent over other customers and/or agents when determining the routing.

18. The non-transitory computer-readable medium of claim 17 wherein at least one override of the one or more overrides is set by the contact center.

* * * * *